US008752695B2

(12) United States Patent
Kwasniewicz et al.

(10) Patent No.: US 8,752,695 B2
(45) Date of Patent: Jun. 17, 2014

(54) ELECTRIC SHAKER CONVEYOR ASSEMBLY

(75) Inventors: Ronald W. Kwasniewicz, Walled Lake, MI (US); Jason L. Smith, Grand Blanc, MI (US)

(73) Assignee: Magnetic Products, Inc., Highland, MI (US)

( * ) Notice: Subject to any disclaimer, the term of this patent is extended or adjusted under 35 U.S.C. 154(b) by 1061 days.

(21) Appl. No.: 11/784,138

(22) Filed: Apr. 5, 2007

(65) Prior Publication Data
US 2008/0245639 A1 Oct. 9, 2008

(51) Int. Cl.
B65G 27/12 (2006.01)
B65G 27/10 (2006.01)

(52) U.S. Cl.
USPC ............. 198/750.1; 198/750.8; 198/769; 198/766; 198/770; 198/764

(58) Field of Classification Search
USPC .................... 198/750.8, 766, 750.1
See application file for complete search history.

(56) References Cited

U.S. PATENT DOCUMENTS

| 1,343,648 | A | | 6/1920 | Smith | |
|---|---|---|---|---|---|
| 2,214,755 | A | | 9/1940 | Tafel | 198/220 |
| 2,378,979 | A | | 6/1945 | Burt | 198/220 |
| 2,473,193 | A | | 6/1949 | Campion | 198/220 |
| 2,800,857 | A | | 7/1957 | Yarmak | 103/3 |
| 3,212,630 | A | | 10/1965 | Allen et al. | 198/220 |
| 3,222,807 | A | * | 12/1965 | Swank | 40/426 |
| 3,712,472 | A | | 1/1973 | Elliott | 210/222 |
| 3,838,769 | A | | 10/1974 | Fishburne et al. | 198/218 |
| 4,112,999 | A | | 9/1978 | Gasper | 164/154 |
| 4,192,419 | A | | 3/1980 | Brodin | 198/750 |
| 4,339,029 | A | | 7/1982 | Wilson | 198/750 |
| 4,505,380 | A | | 3/1985 | McLemore et al. | 198/750 |
| 4,508,208 | A | | 4/1985 | Preedy | 198/751 |
| 4,854,444 | A | | 8/1989 | Iwamoto | 198/750 |
| 5,054,606 | A | | 10/1991 | Musschoot | 198/751 |
| 5,147,031 | A | | 9/1992 | Carpenter | 198/750 |
| 5,178,258 | A | * | 1/1993 | Smalley et al. | 198/750.8 |

(Continued)

FOREIGN PATENT DOCUMENTS

| CA | 2277508 | 1/2001 |
|---|---|---|
| CA | 2313777 | 1/2001 |
| CA | 2432418 | 12/2003 |
| WO | WO 01/76988 A1 | 10/2001 |

OTHER PUBLICATIONS

Mar. 31, 2009 Office Action for U.S. Appl. No. 11/490,013.
Jun. 25, 2009 Amendment for U.S. Appl. No. 11/490,013.

(Continued)

Primary Examiner — Kavel Singh
(74) Attorney, Agent, or Firm — Howard & Howard Attorneys PLLC

(57) ABSTRACT

A shaker conveyor assembly including a housing, a drive system supported by the housing and at least one transport tray supported by the housing and operatively connected to the drive system. The drive system includes an electric motor that produces a rotary output. A cam assembly is operatively connected in driven relationship to the rotary output of the electric motor so as to rotate therewith. A cam follower assembly is operatively connected to the transport tray and is responsive to the rotation of the cam assembly to produce repeated, reciprocating, linear motion and to transmit this motion to the transport tray so as to convey items therealong.

26 Claims, 2 Drawing Sheets

(56) References Cited

U.S. PATENT DOCUMENTS

| | | | |
|---|---|---|---|
| 5,390,781 A | 2/1995 | Foster | 198/750 |
| 5,489,018 A | 2/1996 | Foster | 198/750.5 |
| 5,588,522 A | 12/1996 | Foster et al. | 198/775 |
| 5,676,514 A * | 10/1997 | Higman et al. | 414/339 |
| 5,794,757 A * | 8/1998 | Svejkovsky et al. | 198/750.8 |
| 5,850,906 A | 12/1998 | Dean | 198/750.8 |
| 5,979,640 A | 11/1999 | Horton | 198/770 |
| 6,006,896 A | 12/1999 | Foster | 198/750.5 |
| 6,026,949 A | 2/2000 | Foster | 198/750.5 |
| 6,056,113 A | 5/2000 | Foster | 198/750.5 |
| 6,079,548 A | 6/2000 | Svejkovsky et al. | 198/750.8 |
| 6,189,683 B1 | 2/2001 | Svejkovsky et al. | 198/769 |
| 6,193,050 B1 | 2/2001 | Svejkovsky et al. | 198/347.2 |
| 6,209,713 B1 | 4/2001 | Takahashi et al. | 198/750.8 |
| 6,237,748 B1 | 5/2001 | Kroger | 198/763 |
| 6,286,658 B1 * | 9/2001 | Hufford | 198/766 |
| 6,311,832 B1 | 11/2001 | Kwasniewicz et al. | 198/619 |
| 6,398,013 B1 | 6/2002 | Svejkovsky et al. | 198/750.8 |
| 6,415,911 B1 | 7/2002 | Svejkovksy et al. | 198/750.1 |
| 6,415,912 B1 | 7/2002 | Tamlin | 198/750.8 |
| 6,435,337 B1 | 8/2002 | Sahlberg | 198/766 |
| 6,439,374 B2 | 8/2002 | Kroger | 198/763 |
| 6,439,375 B1 | 8/2002 | Foster et al. | 198/775 |
| 6,490,941 B1 | 12/2002 | Hur | 74/25 |
| 6,527,104 B2 * | 3/2003 | Svejkovsky et al. | 198/769 |
| 6,598,733 B2 | 7/2003 | Kato | 198/750.1 |
| 6,634,488 B2 | 10/2003 | Tamlin | 198/750.8 |
| 6,708,815 B2 | 3/2004 | Kato | 198/750.8 |
| 6,722,492 B2 * | 4/2004 | Trestain | 198/768 |
| 6,880,693 B2 | 4/2005 | Trestain | 198/768 |
| 6,899,218 B2 | 5/2005 | Kwasniewicz et al. | 198/750.7 |
| 6,988,611 B2 | 1/2006 | Kwasniewicz et al. | 198/750.7 |
| 7,083,042 B2 | 8/2006 | Kwasniewicz et al. | 198/750.7 |
| 7,216,757 B1 | 5/2007 | Patterson et al. | 198/750.8 |
| 7,290,648 B2 | 11/2007 | Buonomo | 198/750.2 |
| 7,387,198 B2 | 6/2008 | Thomson | 198/770 |
| 2003/0226743 A1 | 12/2003 | Trestain | 198/769 |

OTHER PUBLICATIONS

Aug. 3, 2009 Notice of Allowance and Fee(s) Due for U.S. Appl. No. 11/490,013.
Brochure—Lahr Conveyors for the Pressroom, Diversatool, Inc.
Brochure—Modular Slug—Vayor the Economical Solution to your Material Transporting Needs, Woodcraft Conveyors, 1991.
Brochure—Increase Efficiency with Bunting Low Profile and Special-Purpose Conveyors, Bunting Magnetics, Co.
Brochure—Model AAA Ultra-Low Profile Model, Livonia Magnetics.

* cited by examiner

ELECTRIC SHAKER CONVEYOR ASSEMBLY

BACKGROUND OF THE INVENTION

1. Field of the Invention

The present invention is directed toward beltless conveyors and, more specifically, to an electric shaker conveyor assembly.

2. Description of the Related Art

Conveyors are well known material handling devices that have application in a wide variety of environments for transporting objects from one place to another. For example, one type of conveyor employs a belt formed into an endless loop which is entrained about at least a pair of rollers spaced apart from one another and usually located at the opposed marginal ends of the conveyor. The rollers have sprockets at either end thereof. The spaced rollers are interconnected by a pair of chains entrained about the sprockets at either end of the rollers. An electric or hydraulic motor is usually employed to power the sprockets and continuously moves the belt over a substantial length of the conveyor between the rollers. In this way, objects may be transported by the conveyor over its length.

Conveyors often find applications in manufacturing environments. For example, in metal stamping operations, conveyors are employed to move parts between successive presses or from a press into a bin. In addition, conveyors are used for inspecting, transporting and assembly situations and can assist in maximizing production by removing parts, slugs or other scrap and materials from under low clearance areas like punch press dies and permitting continuous operation of the press. However, belted conveyors suffer from the disadvantage that the belts are often cut by the sharp edges of the metal parts formed in stamping operations. The useful life of the belts are reduced and the belts must be replaced more frequently. Frequent belt replacement increases the maintenance costs of the stamping operation. Further, stamped parts and other debris may pass through the damaged belts and jam or foul the inner workings of the conveyor drive system.

In part to avoid these problems, beltless conveyors are often employed in certain manufacturing operations. One type of beltless conveyor known in the related art moves items along the length of a conveyor by a physical reciprocating action. The material to be moved is transported in or on a table, channel, or trough. The reciprocating action of the conveyor is faster in one linear direction than the other thereby causing the material to be moved with each forward stroke of the conveyor. The inherent reciprocating action of these types of beltless conveyers causes them to be generally referred to as shaker conveyors. Shaker conveyors do not suffer from cuts or worn belts and thus have been adopted in numerous manufacturing environments.

A shaker conveyor may even be used to transfer corrosive, high-temperature, heavy, or other difficult to transport materials from place to place. For example, hot metal castings, particulate material, or other material difficult to transport due to physical or chemical characteristics can be transported by a shaker conveyor. The flexibility as to different types of materials is derived from the conveyor table or trough, which supports the material being carried. The shaker table can be made of materials resistant to heat, corrosion, or physical or chemical problems caused by the items being conveyed.

As previously mentioned, to convey the items or material on the table, the shaker table may be accelerated in the direction of a desired material movement to reach a maximum forward velocity and then the direction of movement of the table may be rapidly reversed so that the material slides along the table in the desired direction. As the table moves in the reverse direction, the material decelerates and comes to rest, and is then subject to the next reciprocal forward movement of the table so that there is little or no backward sliding of material being conveyed. In this manner, during one of the reciprocal movements, or strokes, the table provides a griping action on the material being conveyed. Conversely, the table provides a sliding action on the material being conveyed during the opposite reciprocal movement.

There are a number of conventional prior art shaker mechanisms that achieve the desired result of a forward motion of material by using a reciprocating action. These conventional shaker conveyors may employ crankshafts or other eccentrics with linkage arms to achieve the desired reciprocal motion, often with heavy flywheels. The linkage arms are pivotably attached to the flywheel or eccentric at one end and are likewise pivotably attached to the shaker table at the one ends. By the inherent physical differences designed into the linkage arms or the placement of their attachment points, or through the use of other mechanical systems, the reverse movement of the shaker table may be faster than the forward movement. While these types of drive mechanisms provide satisfactory reciprocal motion, they typically require a number of operating elements and linkages some of which can be relatively complex, and tend to be difficult to manufacture. These complex shaker assemblies can also be relatively expensive to manufacture and maintain. More specifically, the complex drive systems raise the cost of the shaker conveyor of this type. Furthermore, the linkage arms used to provide the reciprocating motion have a tendency to get out of line, reducing the efficiency of the shaker and causing further operational problems.

Thus, there remains a need in the art for a cost-effective electric shaker conveyor that converts rotary motion of the drive engine into repeated rectilinear motion to the conveyor using an elegantly simple, effective mechanical actuation. Moreover, there remains a need in the art for such a conveyor that is relatively quiet and maintenance free. In addition, there remains a need in the art for such a conveyor that may incorporate these features in a lightweight and compact design such that it may be relatively portable and may be easily employed in any number of relevant applications.

SUMMARY OF THE INVENTION

The present invention overcomes the disadvantages in the related art in a shaker conveyor assembly including a housing, a drive system supported by the housing and at least one transport tray supported by the housing and operatively connected to the drive system. The drive system includes an electric motor that produces a rotary output. A cam assembly is operatively connected in driven relationship to the rotary output of the electric motor so as to rotate therewith. A cam follower assembly is operatively connected to the transport tray and is responsive to the rotation of the cam assembly to produce repeated, reciprocating, linear motion and to transmit this motion to the transport tray so as to convey items therealong.

Thus, the present invention provides a cost-effective electric shaker conveyor that converts rotary motion of the drive engine into repeated, rectilinear motion to the conveyor using an elegantly simple, effective mechanical actuation. The shaker conveyor of the present invention is relatively quiet and maintenance free. It has a lightweight and compact design such that it may be relatively portable and may be easily employed in a number of relevant applications. All bearings are sealed and lubed for the life of the product. Accordingly, the shaker conveyor of the present invention has a high level of reliability when compared with shaker conveyors known in the conventional art.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

One embodiment of the shaker conveyor assembly of the present invention is generally indicated at 10 in FIGS. 1 through 5, where like numerals are used to designate like structure throughout the drawings. The shaker conveyor assembly 10 may be employed in any number of applications and neither the preceding discussion nor the description of the invention that follows should be interpreted as limiting the use of the invention.

Figure 1:
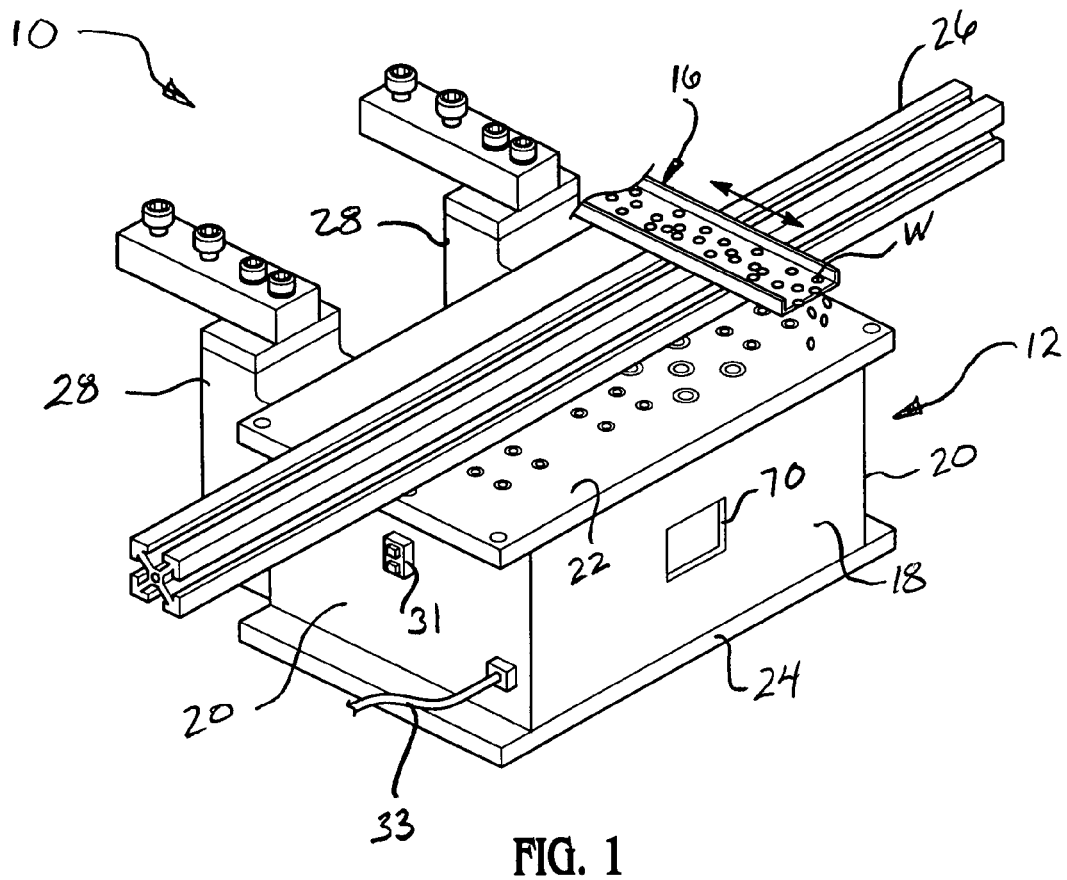
FIG. 1 is a perspective view illustrating the shaker conveyor assembly of the present invention.
Figure 2:
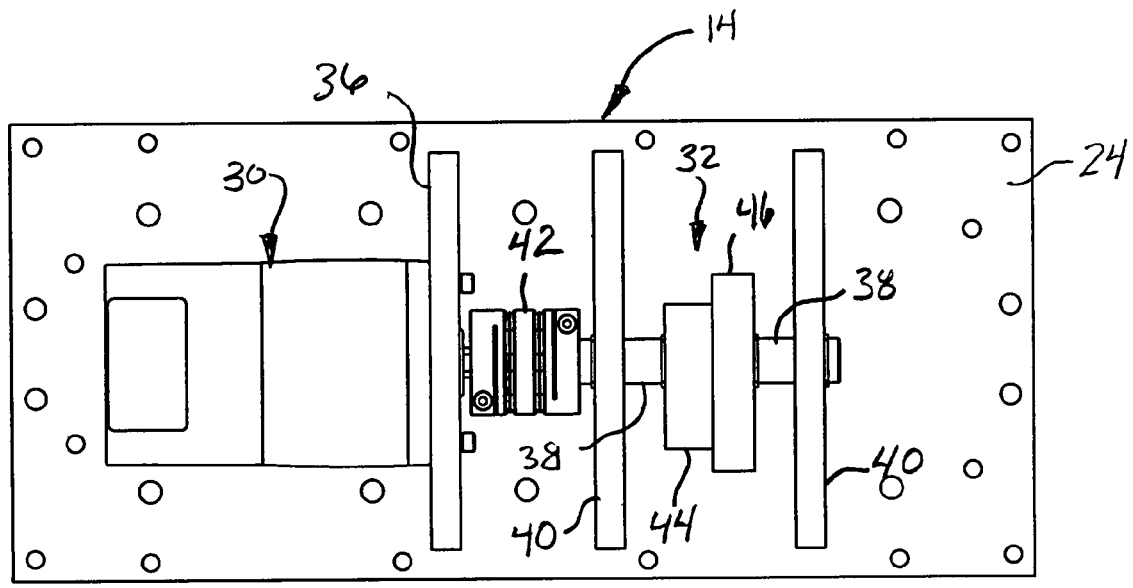
FIG. 2 is a top view of the drive system of the shaker conveyor assembly of the present invention shown mounted to the base of the housing and with the side and end walls as well as the top plate removed.

Referring now to FIGS. 1 and 2, the conveyor assembly 10 of the present invention includes a housing, generally indicated at 12, and a drive system, generally indicated at 14, supported by the housing 12 (FIG. 2). At least one transport tray is generally indicated at 16. The transport tray 16 is supported by the housing 12 and is operatively connected to the drive system 14 as will be described in greater detail below. More specifically, the housing 12 may include a plurality of walls 18, 20 and a top plate 22. The housing 12 may further include a base 24. The plurality of walls may include a pair of sidewalls 18 and a pair of end walls 20 extending between the base 24 and the top plate 22. A rail 26 may be operatively connected to the top plate 22 and used to support one or more transport trays 16. In the embodiment illustrated in FIG. 1, the rail 26 supports one transport tray 16. However, those having ordinary skill in the art will appreciate from the description that follows that the shaker conveyor assembly 10 of the present invention may employ any number of transport trays without departing from the scope of the invention. In fact, the shaker conveyor assembly 10 of the present invention may be employed to service a number of presses or other sources of work product (W). Accordingly, the shaker conveyor assembly 10 of the present invention would employ a corresponding number of transport trays 16 associated with each source of work product (W). Moreover, the assembly may employ some type of mounting system used to fix the location of the shaker conveyor assembly 10 relative to the source of work product (W) that is to be conveyed upon the transport tray 16. To this end, the shaker conveyor assembly 10 of the present invention may employ one or more mounting structures 28 to operatively mount the shaker conveyor assembly relative to, for example, a press or any other structure so that the conveyor assembly 10 may receive and convey the work product (W) therealong as will be described in greater detail below.

Figure 3:
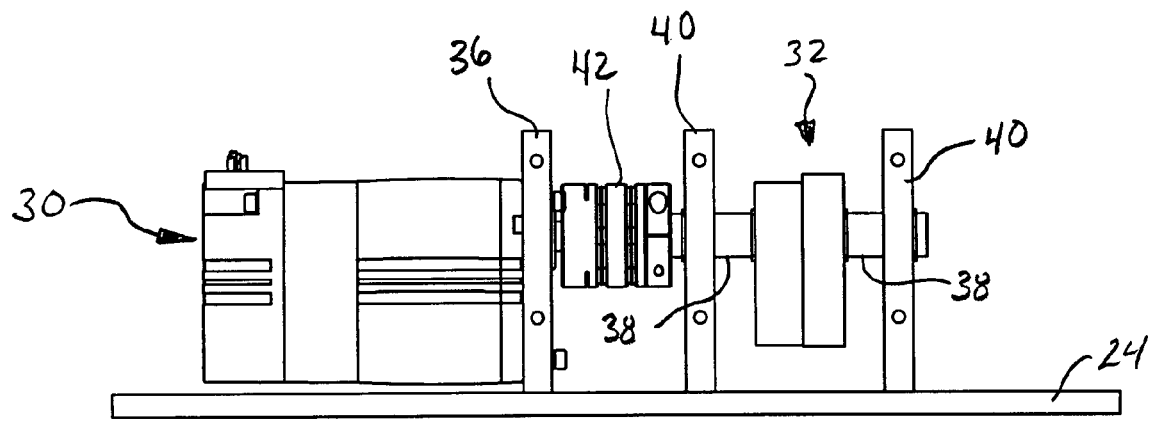
FIG. 3 is a side view of the drive system supported on the base as illustrated in FIG. 2.

Referring now to FIGS. 2-3, the drive system 14 includes an electric motor, generally indicated at 30, that produces a rotary output. A cam assembly is generally indicated at 32 and is operatively connected in driven relationship to the rotary output of the electric motor 30 so as to rotate therewith. A cam follower assembly is generally indicated at 34 in FIG. 4. As will be explained in greater detail below, the cam follower assembly 34 is operatively connected to the transport tray 16 and is responsive to rotation of the cam assembly 32 to produce repeated, reciprocating, linear motion in the direction of the dual headed arrow shown in FIG. 1 and to transmit this motion to the transport tray 16 so as to convey work product (W) therealong. As will be described in greater detail below, the transport tray 16 and the cam follower assembly 34 are operatively connected to the top plate 22 for rectilinear movement therewith.

In one embodiment illustrated in the figures, the electric motor 30 may include an A/C motor having a gear reduction assembly designed to reduce the RPM, but increase the torque, of the rotary output of the electric motor 30. The gear reduction assembly may form a part of the electric motor 30, per se, or take the form of a separate transmission operatively coupled to the electric motor. Alternatively, the electric motor 30 may be directly coupled to the cam assembly 32 in any appropriate manner. The electric motor 30 includes an external, replaceable fuse 31 (FIG. 1). Thus, the electric motor 30 of the shaker conveyor assembly 10 of the present invention is protected from damaged caused, for example, by jamming of the assembly as a result of distorted pans or parts/scrap which interrupt the movement of the conveyor assembly. In this event, the replaceable fuse 31 will blow before any damage is done to the electric motor 30 and may be easily and inexpensively replaced. A conventional power cord 33 supplies electrical power to the electric motor 30 and can be easily replaced if damaged during use at minimal cost. Those having ordinary skill in the art will appreciate from the description that follows that the present invention is not limited in any way by whether the electric motor 30 is powered by A/C or D/C current, or includes a gear reduction or transmission assembly.

The shaker conveyor assembly 10 of the present invention may also include one or more motor mounts 36 operatively fixed to the housing 12 and used to mount the electric motor 30 therein. Similarly, the cam assembly 32 may include a cam shaft 38 supported between a pair of bearing mounts 40. The motor mount 36 and bearing mounts 40 include bearings that are sealed and lubed for the life of the shaker conveyor assembly 10 and act to rotatably support the rotary output of the electric motor 30 and the cam shaft 38, respectively. Like the motor mounts 36, the bearing mounts 40 are operatively fixed to the housing 12. In the embodiment illustrated herein, the motor mount 36 and bearing mounts 40 are supported upon the base 24 and extend between the sidewalls 18 of the housing 12.

A coupler 42 may be employed to operatively interconnect the electric motor 30 and the cam assembly 32. More specifically, the coupler 42 may be used to interconnect the rotary output of the electric motor 30 and the cam shaft 38. However, those having ordinary skill in the art will appreciate that the electric motor 30 may be operatively connected to the cam assembly 32 in any number of ways that translate the rotary output of the electric motor 30 to the cam assembly 32.

The cam assembly 32 includes a first cam 44 that is operatively connected in driven relationship to the rotary output of the electric motor 30. In addition, the cam assembly 32 includes a second cam 46 which, like the first cam, is operatively connected in driven relationship to the rotary output of the electric motor 30. As will be explained in greater detail below, the rotation of the first and second cams 44, 46 is operatively translated to the cam follower assembly 34 to produce reciprocating, rectilinear motion in the first and second directions to advance material along the length of the transport tray 16.

To this end, the cam follower assembly 34 includes a plurality of rollers that are disposed in rolling contact with the cam assembly 32 to translate rotational motion of the cam assembly 32 into rectilinear movement of the cam follower assembly 34. More specifically, the cam follower assembly 34 includes a first cam follower, generally indicated at 48 that is responsive to the rotation of the first cam 44 to move the transport tray 16 in a first linear direction. Similarly, the cam follower assembly 34 includes a second cam follower, generally indicated at 50 that is responsive to the rotation of the second cam 46 to move the transport tray 16 in a second linear direction opposite the first linear direction.

Figure 5:
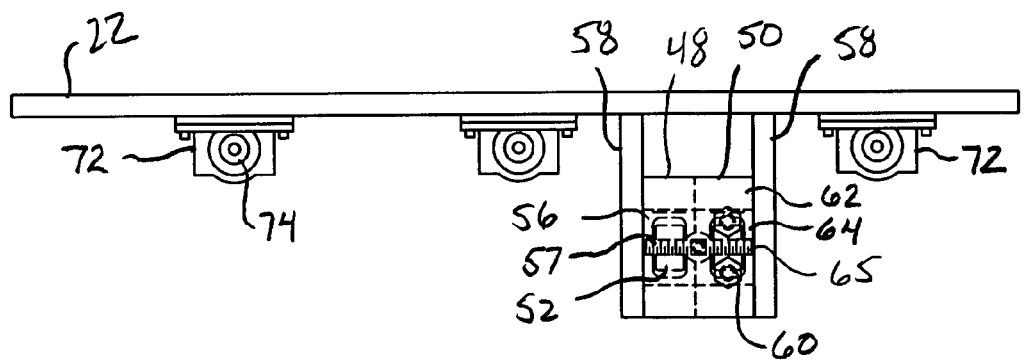
FIG. 5 is a side view showing the linear bearings and the cam follower assembly of the present invention mounted to the top plate of the housing.

As best shown in FIG. 5, the cam follower assembly 34 includes a pair of collars 58 that extend between the sidewalls 18 of the housing. The first cam follower 48 includes an insert 56 that is supported between the pair of collars 58. The first cam follower 48 includes at least one roller 52 that is disposed in rolling contact with the first cam 44. In one preferred embodiment, the roller includes a fixed roller 52 mounted to the insert 56.

Similarly, the second cam follower 50 includes at least one roller 60 which is disposed in rolling contact with the second cam 46. The second cam follower 50 includes an insert 62 that is supported between the collars 58 and disposed opposite the first cam follower 48. The roller may include an adjustable roller 60 that is moveably mounted to the second cam follower 50 and that is adapted for adjustment of its position relative to the second cam 46 so as to facilitate constant contact between the cam follower assembly 34 and the cam assembly 32. More specifically, the insert 62 may include a cartridge 64 that is operatively supported by the insert 62. The adjustable roller 60 is operatively supported by the cartridge 64 via a pin 65 or the like. A biasing mechanism, such as Belleville springs, may be disposed between the cartridge 64 and the insert 62 to bias the roller 60 toward the second cam 46. A pin 66 may be employed between the cartridge 64 and the insert 62 to facilitate the bias of the roller 60 toward the second cam 46 in one plane. One or more adjustment screws 68 may be further employed to adjust the position of the cartridge 64, and therefore the roller 60, relative to the cam 46. In addition, other biasing mechanisms may be employed to take up the tolerances between the cartridge 64 and the inserts 62. Thus, by manipulation of the screws 68, the position of the roller 60 relative to the second cam 46 may be adjusted. Moreover, the adjustment of the second cam follower 50 relative to the cam assembly 32 also adjusts the position of the first cam follower 48, and the fixed roller 52, relative to the first cam 44. In this way, the cam follower assembly 34 of the present invention may be easily, efficiently and effectively adjusted relative to the cam assembly 32 to maintain constant contact therewith.

To this end, the plurality of walls 18, 20 of the housing 12 includes at least one window 70 that is used to facilitate adjustment of the drive system 14. More specifically, and as best shown in FIG. 1, at least one of the sidewalls 18 includes the window 70 through which access to the adjustment screws may be obtained.

Those having ordinary skill in the art will appreciate that, while Belleville springs and threaded screws are disclosed in the preferred embodiment illustrated herein, any type of biasing mechanism or adjustable system commonly known in the related art may be employed in the place of the Belleville springs and screws without departing from the scope of the present invention. Moreover, the designations "first and second cams 44, 46," "first and second cam follower assemblies 48, 50," and their associated inserts, cartridges and rollers 56, 62, 64, 52 and 60, respectively, are merely used in their descriptive sense to distinguish them from one another. Thus, the fixed roller 52 may be employed in connection with the second cam 46 and the adjustable roller 60 may be employed in connection with the first cam 44 without departing from the scope of this invention.

Figure 4:
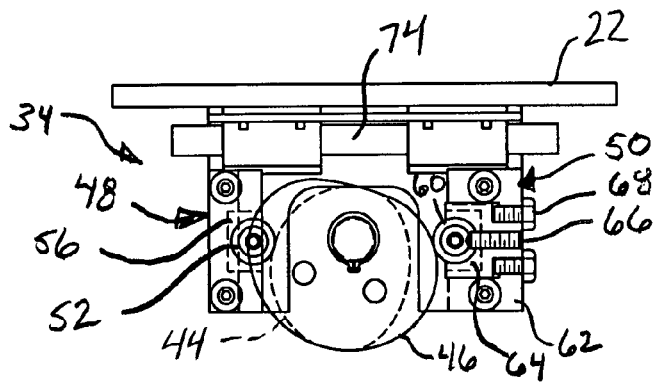
FIG. 4 is a end view illustrating the cam follower assembly mounted to the top plate of the housing and shown relative to the cam assembly of the present invention.

As best shown in FIGS. 4 and 5, the collars 58 of the cam follower assembly 34 are operatively connected to the top plate 22 of the housing 12. The housing 12 further includes a plurality of linear bearings 72 mounted to the top plate 22. Each of the linear bearings 72 is adapted to receive a rail 74 that extends in the direction of reciprocal movement of the top plate 22 to provide stable, rectilinear movement of the top plate 22 relative to the rest of the housing 12. In one preferred embodiment illustrated in FIG. 5, the cam follower assembly 34 is disposed between a pair of the linear bearings.

With reference to FIGS. 3 and 4, it can be seen that the first and second cams 44, 46 are disposed adjacent one another and present cam surfaces that are 180° out of phase relative to one another. Thus, in one preferred embodiment, the first cam 44 may be operative to produce accelerating motion in the first linear direction over approximately 0° to 150° of rotational output of the electric motor. On the other hand, in one preferred embodiment, the second cam 46 may be operable to produce decelerating movement in the second linear direction over approximately 150° to 360° of rotational output of the electric motor.

In operation, the electric motor 30 produces a rotary output that is translated to the cam shaft 38 via the coupler 42. The first cam 44 rotates on the cam shaft 38. The fixed roller 52 on the first cam follower 48 causes the cam follower to move linearly in a first direction. This movement is translated through the collars 58 to the top plate 22 of the housing 12, thereby causing the transport tray 16 to move in the same linear direction. In one preferred embodiment, the movement of the first cam causes the transport tray 16 to accelerate in the first linear direction. Because the profiles of the first and second cams 44, 46 are approximately 180° out of phase, during movement in the first linear direction, the first cam "dominates" and the second cam "follows." Thus movement is only imparted by the first cam to the cam follower assembly 34 during this phase of rotational movement of the cam assembly 32. After the first cam 44 has been rotated over a predetermined angular distance, for example approximately 150°, the second cam 46 becomes dominant and drives the second cam follower 50 in the opposite direction via the contact through the adjustable roller 60 and the collars 58. In one preferred embodiment, the movement of the second cam follower 50 to cause the top plate 22 and transport tray 16 to move in the second, linear direction is slower than the movement of the cam follower assembly 34, top plate 22 and transport tray 16 in the first linear direction. Thus, in one operational mode, the work product (W) is gripped by the transport tray 16 and advanced therewith during movement of the transport tray in the first linear direction as the first cam 44 dominates the movement of the cam follower assembly 34. As the cam assembly 32 continues to rotate, the second cam 46 begins to dominate the cam follower assembly 34. The second cam 46 acts to decelerate the transport tray 16 and move it in the second, opposite linear direction. The mass of the work product (W) and its frictional relationship with respect to the transport tray 16 causes the work product to slide relative to the transport tray and continue to move in the first linear direction. The process is then repeated. Through this repeated, rectilinear movement, work product (W) disposed on the transport tray 16 may be moved in the desired direction.

It should be appreciated that the terms "first" and "second" as applied to the strokes of a shaker table are relative. Furthermore, whether the first or the second speed is higher than, less than, or the same as, the other may depend upon the material to be conveyed and its interaction with the shaker table, such that the griping and sliding actions can be made to occur in either direction as long as the resultant conveyance of the material is in the desired direction.

Thus, the present invention provides a cost-effective electric shaker conveyor that converts rotary motion of the drive engine into repeated, rectilinear motion to the conveyor using an elegantly simple, effective mechanical actuation. The shaker conveyor of the present invention is relatively quiet and maintenance free. It has a lightweight and compact design such that it may be relatively portable and may be easily employed in a number of relevant applications. All bearings are sealed and lubed for the life of the product. Accordingly, the shaker conveyor of the present invention has a high level of reliability when compared with shaker conveyors known in the conventional art.

The invention has been described in an illustrative manner. It is to be understood that the terminology which has been used is intended to be in the nature of words of description rather than of limitation. Those having ordinary skill in the art will appreciate that many modifications and variations of the invention are possible in light of the above teachings. Therefore, within the scope of the claims, the invention may be practiced other than as specifically described.

What is claimed is:

1. A shaker conveyor assembly comprising:
a housing, a drive system supported by said housing and at least one transport tray supported by said housing and operatively connected to said drive system;
said drive system including an electric motor that produces a rotary output, a cam assembly operatively connected in driven relationship to said rotary output of said electric motor so as to rotate therewith, and a cam follower assembly operatively connected to said transport tray and adjustably positioned relative to said cam assembly so as to be movable toward and away from said cam assembly to facilitate constant contact between said cam assembly and said cam follower assembly at initial set up of said cam assembly to compensate for tolerance stack up during manufacturing of the shaker conveyor as well as wear during subsequent operation of the shaker conveyor assembly so that said cam follower assembly's response to the rotation of said cam assembly may be maximized to produce repeated, reciprocating linear motion and to transmit this motion to said transport tray so as to convey items therealong.

2. The shaker conveyor assembly as set forth in claim 1 wherein said cam follower assembly includes a plurality of rollers disposed in rolling contact with said cam assembly to translate rotational motion of said cam assembly into rectilinear movement of said cam follower assembly.

3. The shaker conveyor assembly as set forth in claim 1 wherein said cam assembly includes a first cam operatively connected in driven relationship to said rotary output of said electric motor, said cam follower assembly including a first cam follower that is responsive to the rotation of said first cam to move said transport tray in a first linear direction.

4. The shaker conveyor assembly as set forth in claim 3 wherein said cam assembly includes a second cam operatively connected in driven relationship to said rotary output of said electric motor, said cam follower assembly including a second cam follower that is responsive to the rotation of said second cam to move said transport tray in a second linear direction opposite to said first linear direction.

5. The shaker conveyor assembly as set forth in claim 4 wherein said first and second cams are disposed adjacent one another and present cam surfaces that are 180° out of phase relative to one another.

6. The shaker conveyor assembly as set forth in claim 3 wherein said first cam is operative to produce motion in said first linear direction over approximately 0° to 150° of rotational output of said electric motor.

7. The shaker conveyor assembly as set forth in claim 4 wherein said second cam is operable to produce movement in said second linear direction over approximately 151° to 360° of rotational output of said electric motor.

8. The shaker conveyor assembly as set forth in claim 3 wherein said first cam follower includes at least one roller disposed in rolling contact with said first cam to translate rotational movement of said first cam into rectilinear movement of said cam follower assembly.

9. The shaker conveyor assembly as set forth in claim 8 wherein said roller includes a fixed roller mounted to said first cam follower to translate rotational movement of said first cam into rectilinear movement of said cam follower assembly.

10. The shaker conveyor assembly as set forth in claim 4 wherein said second cam follower includes at least one roller disposed in rolling contact with said second cam to translate rotational movement of said second cam into rectilinear movement of said cam follower assembly.

11. The shaker conveyor assembly as set forth in claim 10 wherein said roller includes an adjustable roller moveably mounted to said second cam follower and adapted for adjustment of its position relative to said second cam so as to facilitate constant contact between said roller and said second cam and to translate rotational movement of said second cam into rectilinear movement of said cam follower assembly.

12. The shaker conveyor assembly as set forth in claim 1 wherein said housing includes a plurality of walls and a top plate, said transport tray and said cam follower assembly operatively connected to said top plate for rectilinear movement therewith.

13. The shaker conveyor assembly as set forth in claim 12 wherein said housing further includes a plurality of linear bearings mounted to said top plate, each of said linear bearings adapted to receive a rail extending in the direction of reciprocal movement of said top plate to provide stable rectilinear movement of said top plate.

14. The shaker conveyor assembly as set forth in claim 13 wherein said cam follower assembly is disposed between a pair of said linear bearings.

15. The shaker conveyor assembly as set forth in claim 12 wherein said housing further includes a bottom plate, said plurality of walls including a pair of sidewalls and a pair of end walls extending upwardly between said base and said top plate.

16. The shaker conveyor assembly as set forth in claim 15 wherein at least one of said plurality of walls of said housing includes at least one window to facilitate adjustments of said drive system.

17. The shaker conveyor assembly as set forth in claim 1 wherein said electric motor is an A/C motor.

18. A shaker conveyor assembly comprising:

a housing, a drive system supported by said housing and at least one transport tray supported by said housing and operatively connected to said drive system;

said drive system including an electric motor that produces a rotary output, a cam assembly having first and second cams disposed adjacent to one another and operatively connected in driven relationship to said rotary output of said electric motor so as to rotate therewith, a cam follower assembly operatively connected to said transport tray and adjustably positioned relative to said cam assembly so as to be movable toward and away from said cam assembly to facilitate constant contact between said cam assembly and said cam follower assembly at initial set up of said cam assembly to compensate for tolerance stack up during manufacturing of the shaker conveyor as well as wear during subsequent operation of the shaker conveyor assembly so that said cam follower assembly's response to rotation of said first and second cams may be maximized to produce repeated, reciprocating linear motion and to transmit said motion to said transport tray so as to convey items therealong.

19. The shaker conveyor assembly as set forth in claim 18 wherein said cam follower assembly includes a plurality of rollers disposed in rolling contact with said first and second cams to translate rotational motion of said first and second cams into rectilinear movement of said cam follower assembly.

20. The shaker conveyor assembly as set forth in claim 18 wherein said cam follower assembly includes a first cam follower that is responsive to the rotation of said first cam to move said transport tray in a first linear direction.

21. The shaker conveyor assembly as set forth in claim 20 wherein said cam follower assembly further includes a second cam follower that is responsive to the rotation of said second cam to move said transport tray in a second linear direction opposite said first linear direction.

22. The shaker conveyor assembly as set forth in claim 21 wherein said first and second cams present cam surfaces that are 180° out of phase relative to one another.

23. The shaker conveyor assembly as set forth in claim 20 wherein said first cam follower includes at least one roller disposed in rolling contact with said first cam to translate rotational movement of said first cam into rectilinear movement of said cam follower assembly.

24. The shaker conveyor assembly as set forth in claim 23 wherein said roller includes a fixed roller mounted to said first cam follower to translate rotational movement of said first cam into rectilinear movement of said cam follower assembly.

25. The shaker conveyor assembly as set forth in claim 21 wherein said second cam follower includes at least one roller disposed in rolling contact with said second cam to translate rotational movement of said second cam into rectilinear movement of said cam follower assembly.

26. The shaker conveyor assembly as set forth in claim 25 wherein said roller includes an adjustable roller moveably mounted to said second cam follower and adapted for adjustment of its position relative to said second cam so as to facilitate constant contact between said roller and said second cam and to translate rotational movement of said second cam into rectilinear movement of said cam follower assembly.

* * * * *